Aug. 8, 1944.  L. R. HALSTEAD  2,355,585
BEAM COMPASS
Original Filed Aug. 8, 1941
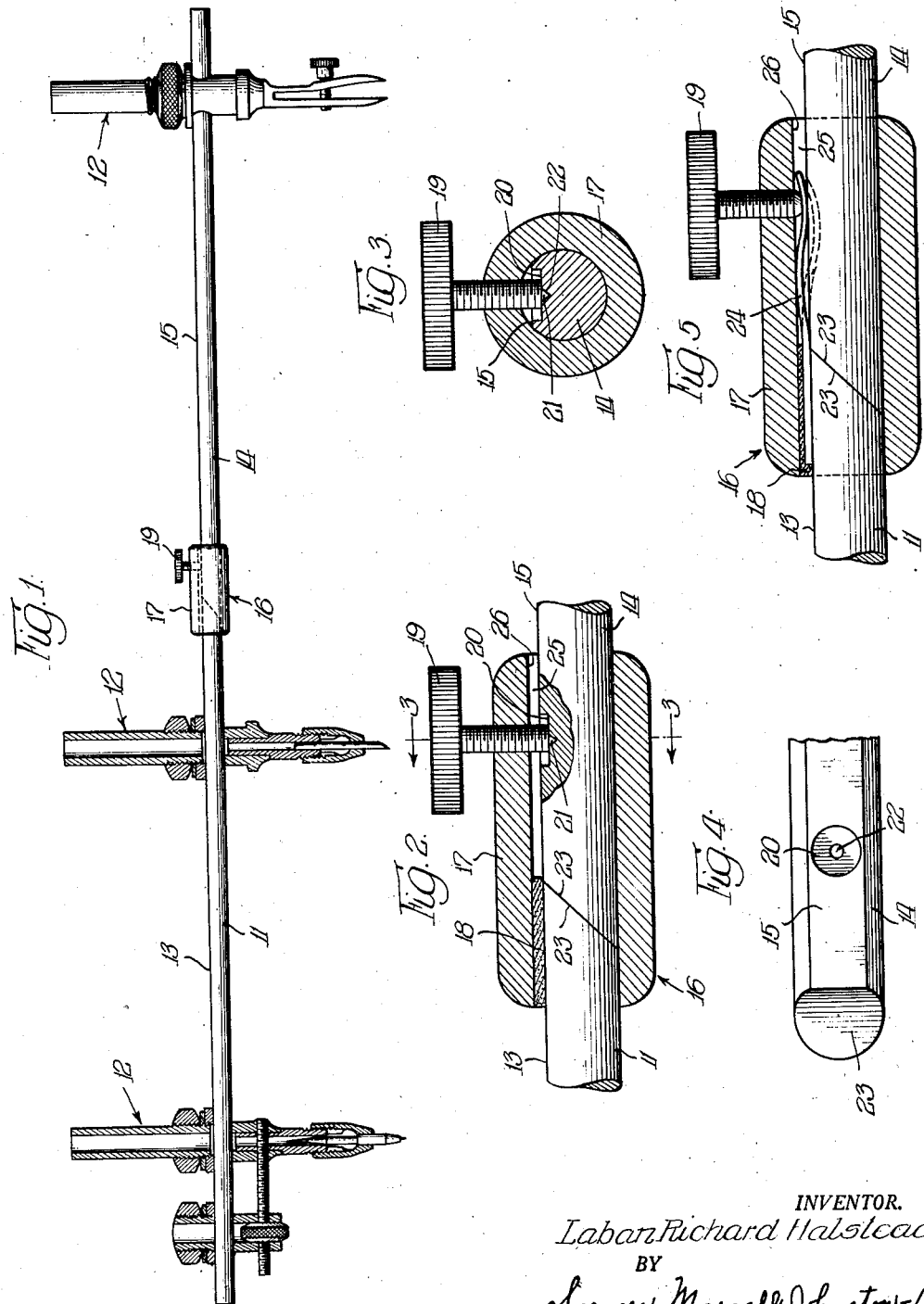
INVENTOR.
Laban Richard Halstead,
BY
Spencer, Marzall, Johnston & Cook
attys.

Patented Aug. 8, 1944

2,355,585

UNITED STATES PATENT OFFICE 2,355,585

BEAM COMPASS

Laban Richard Halstead, Chicago, Ill., assignor to Eugene Dietzgen Co., Chicago, Ill., a corporation of Delaware Original application August 8, 1941, Serial No. 405,924. Divided and this application April 3, 1943, Serial No. 481,730

1 Claim. (Cl. 33—159)

The present invention relates in general to drawing instruments and has more particular reference to an extension for beam compasses.

The present application is a division of my copending application, Serial No. 405,924, filed August 8, 1941.

It has been found desirable in the manufacture and use of beam compasses to utilize a beam comprising a rod or wire of generally circular configuration and having a flat lateral surface for cooperation with scriber elements longitudinally movable on the rod in order to maintain such elements in a common plane on the rod. It has also been found desirable to provide means for extending the beam or rod to afford adjustment of scriber elements in some circumstances over a wider range than is ordinarily required. This involves a provision of connecting means which will serve to secure the abutting ends of adjacent beam sections firmly together and maintain them in adjusted relation.

An important object resides in providing means for connecting rods in end-to-end relationship for the purpose of providing a beam of extended length; a further object being to provide an improved clamp structure for securing rods in end-to-end relationship, the clamp being of simple, inexpensive and light weight construction, yet adequate to maintain rod sections rigidly in alignment, the joint structure being readily operable to connect and disconnect the rod sections; a still further object being to form the connecting clamp as a sleeve secured on an end of one rod section in position forming a pocket for the reception of an end of another section, the sleeve carrying a screw clamp in position to clampingly engage the end of said other section; still another object being to form the clamp engaging end of said other section with a seat for receiving the clamp.

Another important object is to provide cooperating means on the clamp and on the rod end removably receivable in the clamp whereby angularly to orient the rods when secured together in clamped relationship.

Another important object is to utilize rods of generally circular sectional shape and having a flattened side for cooperation with scriber elements to support the same in a common plane, and to provide a clamp for securing rod sections together with the flattened surfaces of the several sections in accurate alignment; a further object being to bevel the abutting ends of adjacent sections whereby to align said sections and to provide a clamp for securing the sections together; a further object being to form at least one section with a clamping pocket in its flattened surface in position to receive a clamping element below said flattened surface in order thus to avoid marring the surface through the action of the clamp element.

Among the other important objects and advantages of the present invention is the provision of an instrument of the character mentioned in which the parts are of simplified, inexpensive, light weight, yet durable construction, thereby to make available, at low cost, a durable and useful beam-type compass.

These and numerous other important objects, advantages, and inherent functions of the invention will become apparent as the invention is more fully understood from the following description, which, taken in connection with the accompany drawing, discloses a preferred embodiment and a modification of the invention.

While there are shown in the drawing preferred embodiments of the invention, it is to be understood that the same are susceptible of modification and change without departing from the spirit of the invention.

The views in the accompanying drawing, which illustrate a selected embodiment of the invention, are as follows:

Fig. 1 is an elevational view illustrating an instrument embodying the present invention;

Fig. 2 is an enlarged sectional view showing a clamp embodying the present invention;

Fig. 3 is a sectional view taken substantially along the line 3—3 in Fig. 2;

Fig. 4 is a fragmentary view of a portion of a rod embodying the present invention; and Fig. 5 is a sectional view illustrating a modified clamp structure.

To illustrate the invention I have shown in Fig. 1 of the drawing a compass comprising a beam 11 and scriber elements 12 supported in spaced position and longitudinally adjustable on the beam. The elements 12 are shown in section as in Fig. 1 of the parent application, but detailed reference to the parts thereof is omitted as unnecessary to a description of the present invention.

The beam 11 preferably comprises a metal rod or wire of circular sectional configuration having a flat surface 13 extending longitudinally thereof as indicated in Fig. 1. The present invention contemplates the provision of an auxiliary extension piece 14 comprising a rod having the same sectional configuration as the rod 11 and having a flat surface 15 in order to extend the effective length of the beam, as by securing the rods 11 and 14 in abutting end-to-end relationship with the surfaces 13 and 15 lying in a common plane, and I provide means for so securing the rods detachably together. To this end I provide a clamp 16 preferably comprising a cylindrical sleeve 17 within which the abutting ends of the members 11 and 14 may be secured. The sleeve is preferably connected on an end of one of the rods as by soldering or brazing. As shown in Figs. 1, 2 and 5, the sleeve is secured on the rod 11 by means of the solder 18, the end of the rod 11 extending into the bore of the sleeve at one end thereof so that the end of the rod 14 may be removably inserted in the other end of the sleeve. The abutting ends of the rods 11 and 14 are preferably formed, as by beveling the same, so that when brought together, the interfitting ends will cause the abutting rods to assume a position in which the surfaces 13 and 15 lie in a common plane.

The sleeve 17 is fitted with clamping means shown as a thumb screw 19 having a stem threaded in the sleeve 17 in position to engage and grip the end of the rod 14 and retain it in the sleeve in clamped position aligned with the rod 11. It will be noted that the clamping screw 19 is positioned to engage the flat surface 15 near the end of the extension rod 14. As a function of the surface 15 is to cooperate with a clamping means provided on the scriber elements and this necessitates preservation of the surface in smooth condition, it is desirable that means may be provided for preventing the surface 15 from becoming burred or scratched through the clamping action of the screw 19. To this end a socket 20 is provided on the rod 14 on the surface 15 in position to receive the end of the screw 19. The clamping end of the screw 19 may be formed with a small conical point 21 to enter a corresponding depression 22 in the bottom of the socket 20, so that by tightening the screw 19 upon the rod 14 this rod may be held with its beveled end 23 tightly abutting upon the correspondingly beveled end 23 of rod 11.

In the arrangement shown in Fig. 5 of the drawing a flat strip of spring material 24 is mounted in the sleeve 17, one end of the spring 24 extending into the opening 25 between the flat surface 13 of the rod 11 and the adjacent inner surface 26 of the sleeve 17 and being held in place by the solder 18. The free end of the spring 24 extends opposite the clamping end 21 of the screw 19 so that the screw may be tightened upon the surface 15 of the rod 14 without marring the same.

Changes may be made in the form, construction and arrangement of the parts without departing from the spirit of the invention, and the right is hereby reserved to make all such changes as fairly fall within the scope of the following claim.

The invention is hereby claimed as follows:

A connector for a beam compass extension, wherein the beam section is generally circular and the beam has a longitudinally extending flat surface, comprising a sleeve anchored on the beam adjacent one end thereof and in generally co-axial relation therewith, a strip of resilient material having an end portion anchored in the sleeve, the said strip having a flat surface arranged adjacent the said flat surface of the beam and extending longitudinally beyond the said end thereof, said sleeve being arranged to receive an end of an extension member corresponding with the end of the said beam and in abutting relation therewith, a portion of the said surface of said strip being arranged for orienting the said extension member upon its being inserted in the sleeve to a position corresponding to the position of said beam, and means on the said sleeve for securing the said extension member in end-to-end abutting relation with said beam and comprising a clamp member mounted on the sleeve for movement in a generally radial direction and operable to engage a portion of said strip whereby to cause adjacent surfaces of said strip and said extension member to be brought into clamping engagement with one another and to be maintained in such engagement.

LABAN RICHARD HALSTEAD.